United States Patent
Nagesh et al.

(10) Patent No.: US 11,433,622 B2
(45) Date of Patent: Sep. 6, 2022

(54) ENERGY DIRECTOR DESIGN

(71) Applicant: GM GLOBAL TECHNOLOGY OPERATIONS LLC, Detroit, MI (US)

(72) Inventors: Athreya Nagesh, Royal Oak, MI (US); Bradley J. Blaski, Sterling Heights, MI (US); Jason Ohls, Utica (NL); Joseph M. Lendway, IV, Dryden, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 158 days.

(21) Appl. No.: 16/858,894

(22) Filed: Apr. 27, 2020

(65) Prior Publication Data
US 2021/0331427 A1    Oct. 28, 2021

(51) Int. Cl.
*B29C 65/00*    (2006.01)
*B29C 65/08*    (2006.01)

(52) U.S. Cl.
CPC ........ *B29C 66/30223* (2013.01); *B29C 65/08* (2013.01)

(58) Field of Classification Search
CPC .......................... B29C 66/30223; B29C 65/08
See application file for complete search history.

(56) References Cited

U.S. PATENT DOCUMENTS

| | | | | |
|---|---|---|---|---|
| 3,992,226 A | * | 11/1976 | Godshalk | H01M 50/308 429/89 |
| 4,618,516 A | * | 10/1986 | Sager | B29C 66/8322 428/542.8 |
| 5,401,342 A | * | 3/1995 | Vincent | B29C 66/73921 156/73.1 |
| 6,248,194 B1 | | 6/2001 | Kanner | |
| 2003/0219602 A1 | * | 11/2003 | Kagan | B29C 65/3464 428/411.1 |
| 2013/0334353 A1 | * | 12/2013 | Takenoshita | B65H 75/14 242/118.6 |
| 2016/0167288 A1 | * | 6/2016 | Rodgers | B29C 66/1122 156/73.1 |

FOREIGN PATENT DOCUMENTS

| | | | | |
|---|---|---|---|---|
| DE | 102005046137 A1 | | 4/2006 | |
| EP | 1568470 A2 | | 8/2005 | |
| JP | 63139727 A | * | 6/1988 | ......... B29C 66/1122 |
| WO | 0046028 A1 | | 8/2000 | |
| WO | 2018172385 A1 | | 9/2018 | |

\* cited by examiner

*Primary Examiner* — Daniel McNally
(74) *Attorney, Agent, or Firm* — Lorenz & Kopf LLP (57) ABSTRACT

In an accordance with an exemplary embodiment, an energy director is provided for use in ultrasonic welding, the energy director including: a first raised region extending upward from a surface of a base of a component to be welded; and a second raised region extending upward from the first raised region; wherein the first raised region is disposed underneath the second raised region, such that when material of the second raised region melts, the material of the first raised region is not melted and maintains an adhesive bond line thickness.

17 Claims, 4 Drawing Sheets

ENERGY DIRECTOR DESIGN

INTRODUCTION

The technical field generally relates to the field of ultrasonic welding, and, more specifically, to an energy director for ultrasonic welding.

Ultrasonic welding is utilized in certain applications today. During ultrasonic welding, plastics or metals are welded together via application of high frequency energy and pressure to generate heat in the materials that are to be welded together. In certain examples, energy directors are utilized to facilitate the welding, for example to create a localized position for initiation of the welding. However, in certain situations, existing energy directors may not always provide for optimal welding results, for example with respect to strength and consistency of the weld.

Accordingly, it is desirable to provide assemblies and components for ultrasonic welding, for example with improved energy director designs. Furthermore, other desirable features and characteristics of the present invention will become apparent from the subsequent detailed description of the invention and the appended claims, taken in conjunction with the accompanying drawings and this background of the invention.

SUMMARY

In an accordance with an exemplary embodiment, an energy director is provided for use in ultrasonic welding, the energy director including: a first raised region extending upward from a surface of a base of a component to be welded; and a second raised region extending upward from the first raised region; wherein the first raised region is disposed underneath the second raised region, such that when material of the second raised region melts, the material of the first raised region is not melted and maintains an adhesive bond thickness.

Also in one embodiment, the base includes a nylon resin and carbon fiber bundle reinforced thermal plastic; and the second raised region includes a nylon resin rich material.

Also in one embodiment, the first raised region includes a dome shape extending upward from the surface of the base; and the second raised region extends upward from the dome shape.

Also in one embodiment, the energy director also includes a third raised region extending upward from the first raised region; wherein the first raised region is disposed underneath the third raised region, such that when material of the third raised region melts, then material of the second raised region melts and the first raised region does not melt.

Also in one embodiment, the first, second, and third raised regions collectively form a bullseye pattern.

Also in one embodiment, the first raised region includes a first dome shape; and the second raised region includes a second dome shape that is on top of the first dome shape.

Also in one embodiment, the second region includes a plurality of second sub-regions, each of the plurality of second sub-regions extending upward from, and on top of, the first raised region.

Also in one embodiment, the second raised region includes a cross shape; and the first raised region includes a dome shape underneath the cross shape.

Also in one embodiment, the second raised region includes a star shape; and the first raised region includes a dome shape underneath the star shape.

Also in one embodiment, the first raised region includes a raised dome; and the second and third regions include a plurality of arc shapes, each of the arc shapes on top of the first raised dome region.

Also in one embodiment, the first raised region sets an adhesive bond gap for the components and reduces carbon fiber bundles flow.

In another exemplary embodiment, a weld component for ultrasonic welding is provided, the weld component including: a base; and an energy director including: a first raised region extending upward from the base; and a second raised region extending upward from the first raised region; wherein the first raised region underneath the second raised region, such that when material of the second raised region melts, the material of the first raised region does not melt and acts to maintain an adhesive bond line thickness between the welded parts.

Also in one embodiment, the base includes a nylon resin and carbon fiber bundle reinforced thermal plastic; and the second raised region includes a nylon resin rich material.

Also in one embodiment: the first raised region includes a dome shape extending upward from the upper surface of the base; and the second raised region extends upward from the dome shape.

Also in one embodiment, the energy director further includes a third raised region extending upward from the second raised region; wherein the second raised region is disposed underneath the third raised region, such that when material of the third raised region melts, then the second raised region melts.

Also in one embodiment, the first, second, and third raised regions collectively form a bullseye pattern.

Also in one embodiment, the first raised region includes a first dome shape; and the second raised region includes a second dome shape that is on top of the first dome shape.

Also in one embodiment, the second raised region includes a plurality of second sub-regions, each of the plurality of second sub-regions extending upward from, and surrounded by, the first raised region.

Also in one embodiment, the first raised region sets an adhesive bond gap for the components and reduces carbon fiber bundles flow.

In another exemplary embodiment, a welding assembly is provided that includes: a first component to be welded, the first component including: a first base; and an energy director including: a first raised region extending upward from the first base; and a second raised region extending upward from the first raised region; wherein the first raised region is disposed underneath the second raised region, such that when material of the second raised region melts, the material of the first raised region does not melt and maintains an adhesive bond thickness between the welded parts; a second component to be welded to the first component, the second component including a second base; and a horn configured to be applied to the second base, for ultrasonic welding of the second component to the first component via the energy director.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

As depicted in FIGS. 1A-8B and described below, in various embodiments, components are provided for ultrasonic welding that include energy directors having raised surfaces extending from a base of the component. The energy directors are formed as part of the component to be welded and in general, focus energy for optimal weld formation. As described further below in connection with FIGS. 1A-8B, in various embodiments, the energy director includes a first raised region extending upward from a surface of a base of the component to be welded; and a second raised region extending upward from the first raised region. Also in various embodiments depicted in FIGS. 1A-8A and described below, the first raised region is underneath the second raised region, such that when material of the second raised region melts, the material of the first raised region is not melted. In certain embodiments, the weld components and assemblies described herein are used to ultrasonically weld the composite components of a truck bed inner box (e.g., for a pick-up truck) via ultrasonic welding; however, this may vary in different embodiments.

Figure 1A:
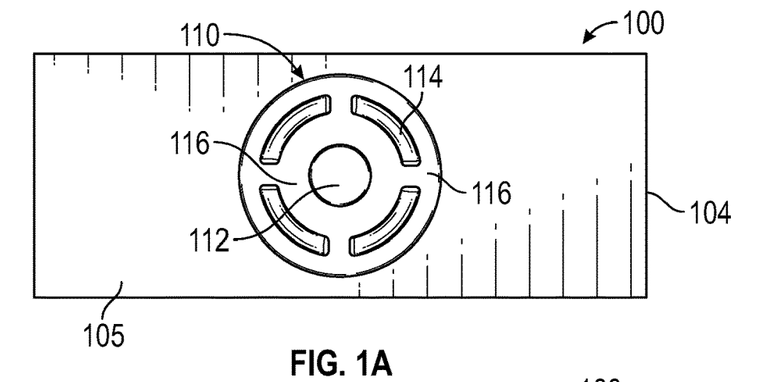
FIGS. 1A and 1B provide a top view and perspective view, respectively, of a weld component to be welded via ultrasonic welding, the weld component including an energy director with raised surfaces in the form of a bullseye pattern, for controlling welding of the component, in accordance with an exemplary embodiment.
Figure 1B:
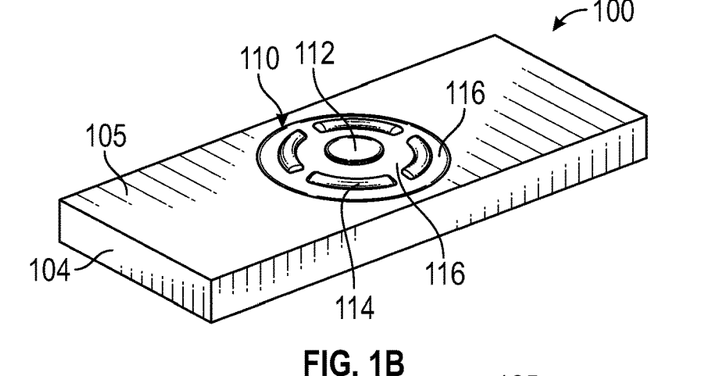

First, with respect to FIGS. 1A and 1B, a top view and perspective view, respectively, are provided of a weld component 100 for ultrasonic welding, in accordance with an exemplary embodiment. In various embodiments, the weld component 100 includes a base 104 having an upper surface 105, and an energy director 110 extending from the upper surface 105 of the base 104. Also in various embodiments, the base 104 is made of a carbon fiber reinforced thermal plastic, and the energy director 110 is composed mostly of a nylon resin rich material that melts during ultrasonic welding along with carbon fiber bundles that do not melt during ultrasonic welding. In certain embodiments: (i) the base 104 comprises a carbon fiber reinforced thermal plastic (CFRTP) material with approximately thirty percent (30%) carbon fiber bundles and seventy percent (70%) nylon resin; and (ii) the energy director 110 comprises a nylon resin rich material with approximately ten percent (10%) carbon fiber bundles and ninety percent (90%) nylon resin; however, these values may vary in different embodiments.

In various embodiments, these components and materials are also utilized in the various exemplary embodiments and implementations of FIGS. 1A-8B herein.

As shown in FIGS. 1A and 1B, in certain embodiments, the energy director 110 includes three distinct levels of raised regions, namely: (i) a first raised dome region 116; (ii) a second raised region 114; and (iii) a third raised region 112. In various embodiments, the first raised region 116 comprises a dome shape extending upward from the top surface 105.

Also in various embodiments, the second raised region 114 extends upward from the dome shape of the first region 116. As depicted in FIGS. 1A and 1B, in certain embodiments, the second raised region 114 comprises a plurality of curved portions, or arcs, extending in a general circular manner above the first raised dome region 116.

In addition, in various embodiments, the third raised region 112 comprises a raised circular region, or an additional dome, that extends above both the first region 116 and the second region 114. As shown in FIGS. 1A and 1B, in various embodiments the first, second, and third regions 116, 114, and 112 collectively form a bullseye pattern for the energy director 110. In various embodiments, the third raised region 112 comprises mostly nylon resin, the first region 116 comprises a carbon fiber bundles and nylon resin, and the second raised region 114 comprises mostly nylon resin. In certain embodiments, the first raised region 116 comprises a solid dome region.

Figure 2:
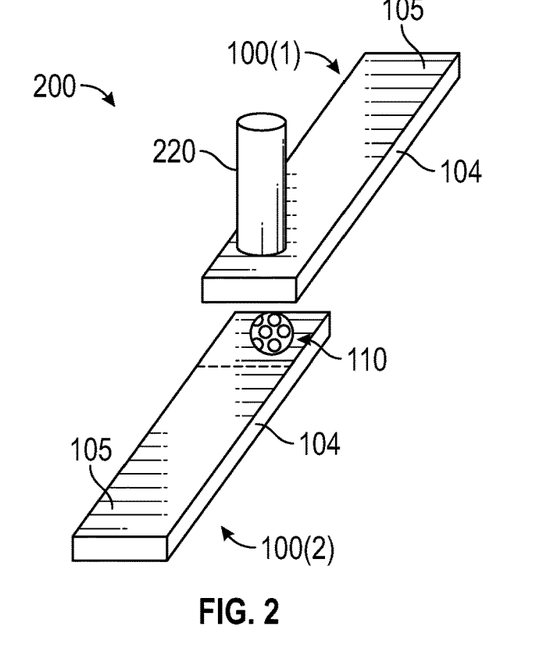
FIG. 2 is a schematic view of a welding assembly that includes weld components, including a weld component with an energy director with raised surfaces for controlling welding of the component, such as the energy director of FIG. 1, and including a horn for ultrasonic welding, in accordance with an exemplary embodiment.

With further reference to FIGS. 1A and 1B, in various embodiments, as ultrasonic welding is initiated, the material of the third raised region 112 is the first to melt. Specifically, in various embodiments, the nylon resin material in the third raised region 112 melts from the application of a metallic horn (e.g., the horn 220 as depicted in FIG. 2) with a specific high frequency and pressure to generate heat during ultrasonic welding.

Subsequently, as ultrasonic welding continues (e.g., as the application of the high frequency and pressure of the horn increases during ultrasonic welding), the nylon resin rich material portion of the second raised region 114 begins to melt.

In addition, in various embodiments, once the melted nylon resin material of the first third raised region 112 and the second raised region 114 reaches the upper surface 105 of the mating part, the melted nylon resins (regions 112 & 114) melt into the nylon resin of the upper surface 105 of the mating part and then solidify, the welding is complete (e.g., because the carbon fiber bundles of the first raised region 116 does not melt during the ultrasonic welding). In various embodiments, the material of the first raised region 116 does not melt, but rather is used as a bond gap that helps maintain the proper thickness of the adhesive between the mating parts. In various embodiments, the energy director 110 (including the first raised region 116 thereof) contacts the upper surface 105 of the component 100 to be welded together, such that the nylon resins of the components 100 are welded together during the ultrasonic welding.

With continued reference to FIGS. 1(A) and 1(B), in various embodiments the bullseye pattern design for the energy director 110 mitigates the flow of carbon fiber bundles into the second raised region 114 and the third raised region 112, allowing for a higher strength ultrasonic welds within the faying surface. Also in various embodiments, the bullseye pattern energy director 110 is a dual purpose design, allowing adhesive bond line thickness control and restricting unwanted carbon fiber bundle flow. In addition, in various embodiments, when the ultrasonic energy is turned on, and the hammering effect of the horn growing and shrinking creates heat, the bullseye pattern energy director 110 focuses the heat into a controlled area first at the center (namely, the third raised region 112), melting the nylon resin uniformly. In various embodiments, the nylon resin then reaches the second raised region 114, melting the nylon resin uniformly, while region 116 maintains the adhesive joint bond line thickness.

FIG. 2 is a schematic view of a welding assembly 200 that includes a welding horn 220 along with weld components 100(1) and 100(2), each having respective bases 104 with respective upper surfaces 105, in accordance with an exemplary embodiment. As shown in FIG. 2, in certain embodiments, a welding horn 220 (e.g., made of metal) is provided against the upper surface 105 of a first weld component 100(1), and an energy director 110 (e.g., of the type depicted in FIGS. 1A and 1B and described above) extends from the upper surface 105 of a second weld component 100(2). Also in various embodiments, the components 100(1) and 100(2) are welded together via ultrasonic welding when a controller (not depicted) controls the horn 220 to be applied against the components 100, via the energy director 110.

Figure 3:
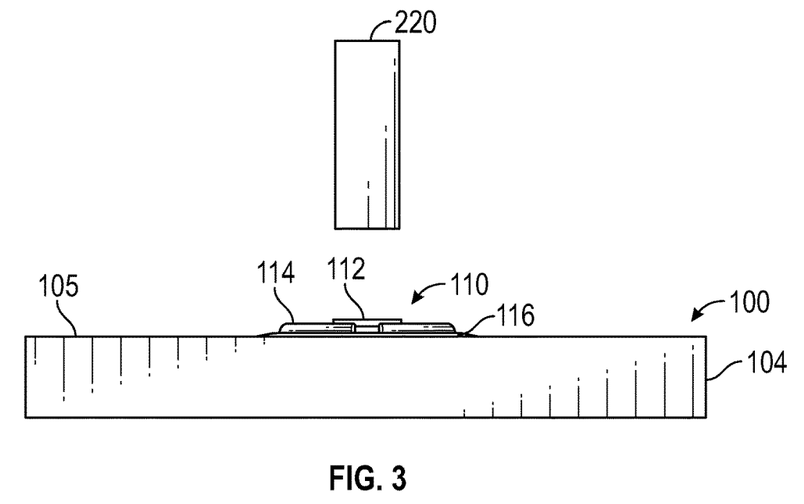
FIG. 3 is a side view of the weld component of FIG. 1, including the energy director thereof, depicted as implemented in connection with the welding assembly of FIG. 2, in accordance with an exemplary embodiment.

FIG. 3 is a side view of the component 100, including the energy director 110 thereof, of FIG. 1, in accordance with an exemplary embodiment. Specifically, in FIG. 3, a side view of the component 100 of FIG. 1 (including the energy director 110 thereof) is depicted as implemented in connection with the welding assembly of FIG. 2, in accordance with an exemplary embodiment. In various embodiments, a high frequency (e.g., 20-30 kHz) is applied to the component 100 via the horn 220 of FIG. 2, as directed by a controller (not depicted), in conducting the ultrasonic welding.

Figure 4A:
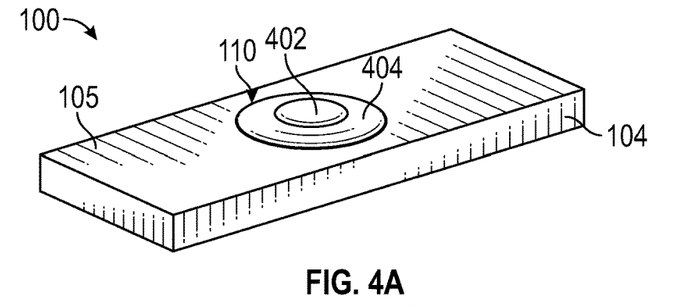
FIGS. 4A, 4B, and 4C provide a perspective view, a top view, and a side view, respectively, of a weld component with a second exemplary configuration of an energy director with a concentric dome pattern for controlling welding of the component, in accordance with an exemplary embodiment.
Figure 4B:
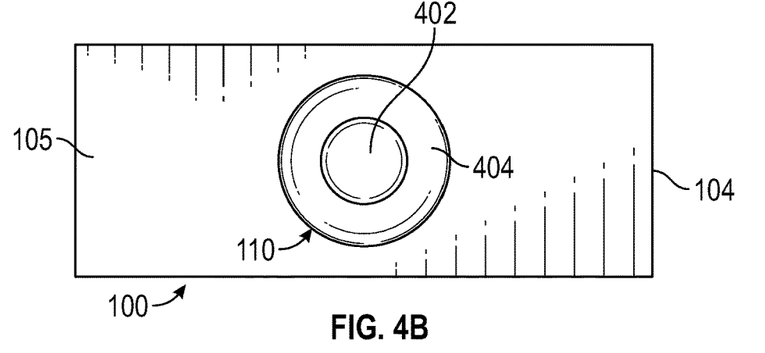
Figure 4C:
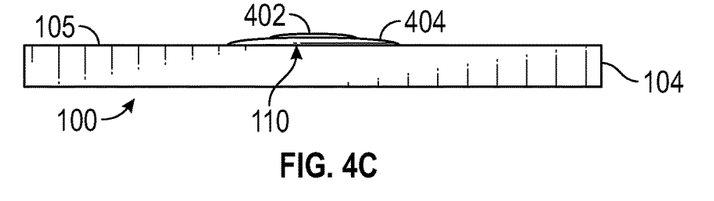

FIGS. 4A, 4B, and 4C provide perspective, top, and side views, respectively, of a weld component 100 with a second exemplary configuration of an energy director 110 with a concentric dome pattern for controlling welding of the component 100, in accordance with an exemplary embodiment.

As shown in FIGS. 4A, 4B, and 4C, in certain embodiments, the energy director 110 includes two distinct levels of raised regions, namely: (i) a first raised region 404; and (ii) a second raised region 402. In various embodiments, the first raised region 404 comprises a first dome shape extending upward from the top surface 105. Also in various embodiments, the second raised region 402 comprises a second dome shape that sits on top of the first dome shape. In various embodiments, the second raised region 402 comprises mostly nylon resin, and the first region 104 comprises carbon fiber bundles and nylon resin.

With further reference to FIGS. 4A, 4B, and 4C, in various embodiments, as ultrasonic welding is initiated, the material of the second raised region 402 melts from the application of a metallic horn (e.g., the horn 220 as depicted in FIG. 2) with a specific high frequency (e.g., 20-30 kHz) and pressure to generate heat during ultrasonic welding. The material of the second raised region 402 melts, but the carbon fiber bundles and nylon resin of the first raised region 404 that is beneath does not melt. In certain embodiments, the first raised region 404 helps to prevent the flow of carbon fiber bundles into the second raised region 402.

In addition, in various embodiments, once the melted nylon resin material of the second raised region 402 reaches the upper surface 105 of the adjacent part, the melted nylon resin of region 402 melts into the nylon resin of the upper surface 105 of the mating part and then solidifies, the welding is complete. In various embodiments, the material of the first raised region 404 does not melt (because the carbon fiber bundle material of the first raised region 404 does not melt during the ultrasonic welding), but rather is used as a bond gap that helps to control the proper thickness of the adhesive between the parts. In various embodiments, a nylon resin component of the energy director 110 contacts the upper surface 105 of the component 100 to be welded together, such that the nylon resin of the respective components 100 are welded together during the ultrasonic welding.

With continued reference to FIGS. 4A, 4B, and 4C, and similar to the discussion above, in various embodiments the design for the energy director 110 mitigates the flow of carbon fiber bundles into the top layer of material (i.e., the second raised region 402), allowing for a higher strength ultrasonic welds within the faying surface. Also in various embodiments, the energy director 110 is a dual purpose design, allowing adhesive bond line thickness control and restricting unwanted carbon fiber bundle flow into the upper welding surface. In addition, in various embodiments, when the ultrasonic energy is turned on, and the hammering effect of the horn growing and shrinking creates heat, the energy director 110 focuses the heat into a controlled area first at the center (namely, the second raised region 402), melting the nylon resin uniformly, while the first raised region 404 (un-melted) maintains the adhesive joint bond line thickness.

Figure 9:
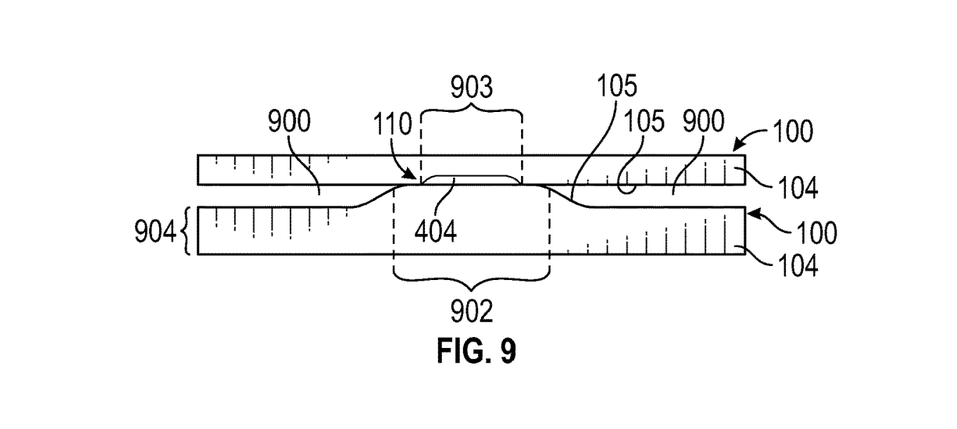
FIG. 9 provides a side view of a pair of weld components welded together, for example corresponding to the embodiment of FIG. 4C, and showing an adhesive bond of uniform thickness between the components.

With reference to FIG. 9, a side view is provided of a pair of weld components 100 welded together, in an accordance with an exemplary embodiment corresponding to the energy director design 110 depicted in FIG. 4C. As shown in FIG. 9, the top dome (i.e., second raised region) 402 has already melted, and the base dome (i.e., first raised region) 404 remains between the surfaces 105 of the components 100. As shown in FIG. 9, in this exemplary embodiment, the first raised region 404 maintains a uniform gap 900 between the respective surfaces 105 of the components 100 that is filled with adhesive material. In the depicted embodiment, the uniform gap 900 is approximately 0.4 mm; however, this may vary in other embodiments. Also in the depicted embodiment, (i) a height 904 of the base 104 of each component 100 is approximately equal to 2.5 mm; (ii) a region 902 of welding is approximately 9 mm in diameter; and (iii) a region 903 occupied by the first raised region 404 is approximately 5 mm in diameter or 4 mm in diameter, or 3 mm in diameter. However, these values may also vary in different embodiments.

Figure 5A:
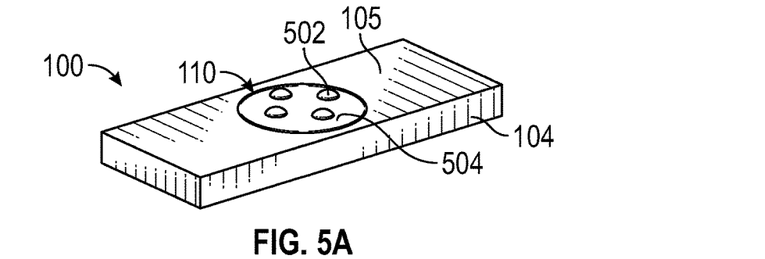
FIGS. 5A and 5B provide a perspective view and a top view, respectively, of a weld component with a third exemplary configuration of an energy director with a number of raised surfaces of different sizes for controlling welding of the component, in accordance with an exemplary embodiment.
Figure 5B:
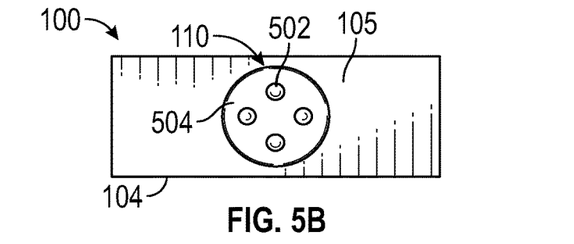

FIGS. 5A and 5B provide perspective and top views, respectively, of a weld component 100 with a third exemplary configuration of an energy director 110 including a number of raised surfaces of different sizes for controlling welding of the component 100, in accordance with an exemplary embodiment.

As shown in FIGS. 5A and 5B, in certain embodiments, the energy director 110 includes two distinct levels of raised regions, namely: (i) a first raised region 504; and (ii) a second raised region 502. In various embodiments, the first raised region 504 comprises a dome shape extending upward from the top surface 105. Also in various embodiments, the second raised region 502 comprises a plurality of circular (or mini-dome) sub-regions, each of the plurality of circular sub-regions extending upward from the dome of the first raised region 504. In various embodiments, the second raised region 502 comprises mostly nylon resin (with minimal carbon fiber bundles), and the first region 504 comprises carbon fiber bundles with nylon resin.

With further reference to FIGS. 5A and 5B, in various embodiments, as ultrasonic welding is initiated, the material of the second raised region 502 (namely, the various circular sub-regions thereof) melts from the application of a metallic horn (e.g., the horn 220 as depicted in FIG. 2) with a specific high frequency (e.g., 20-30 kHz) and pressure to generate heat during ultrasonic welding. As the material of the second raised region 502 (namely, the various circular sub-regions thereof) melts, the first raised region 504 does not melt, due to the rich carbon fiber bundles. In certain embodiments, the first raised region 504 helps to prevent the flow of carbon fiber bundles into the second raised region 502.

In addition, in various embodiments, once the melted nylon resin material of the second raised region 502 reaches the upper surface 105 of the adjacent part 100, the melted nylon resin of region 502 melts into the nylon resin of the upper surface 105 of the mating part and then solidifies, the welding is complete. In various embodiments, the material of the first raised region 504 does not melt (e.g., because it is rich in carbon fiber bundles which do not melt during ultrasonic welding), but rather is used as a bond gap that helps to control the adhesive thickness between the welded parts. In various embodiments, the energy director 110 (including the first raised region 504) contacts the upper surface 105 of the components 100 to be welded together, such that the nylon resin of the respective components are welded together during the ultrasonic welding.

With continued reference to FIGS. 5A and 5B, and similar to the discussion above, in various embodiments the design for the energy director 110 mitigates the flow of carbon fiber bundles into the second raised region 502, allowing for a higher strength ultrasonic welds within the faying surface. Also in various embodiments, the energy director 110 is a dual purpose design, allowing adhesive bond line thickness control and restricting unwanted carbon fiber bundle flow. In addition, in various embodiments, when the ultrasonic energy is turned on, and the hammering effect of the horn growing and shrinking creates heat, the energy director 110 focuses the heat into a controlled area first at the center (namely, the second raised region 502), melting the nylon resin uniformly, while the first raised region 504 maintains the adhesive joint bond line thickness.

Figure 6A:
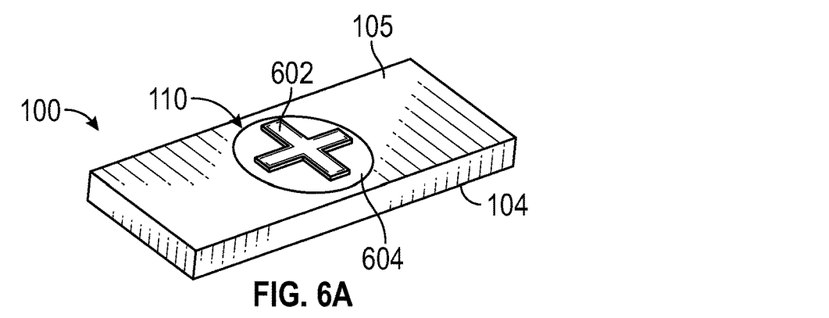
FIGS. 6A and 6B provide a perspective view and a top view, respectively, of a weld component with a fourth exemplary configuration of an energy director with raised surfaces including a cross and dome pattern for controlling welding of the component, in accordance with an exemplary embodiment.
Figure 6B:
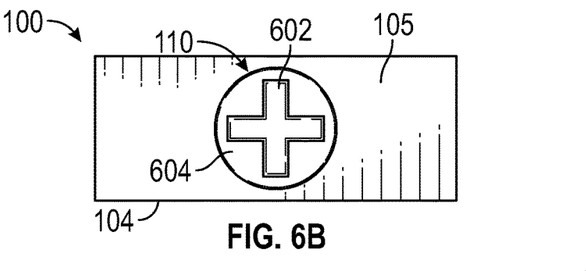

FIGS. 6A and 6B provide perspective and top views, respectively, of a weld component 100 with a fourth exemplary configuration of an energy director 110 with raised surfaces including a cross and dome pattern for controlling welding of the component 100, in accordance with an exemplary embodiment.

As shown in FIGS. 6A and 6B, in certain embodiments, the energy director 110 includes two distinct levels of raised regions, namely: (i) a first raised region 604; and (ii) a second raised region 602. In various embodiments, the first raised region 604 comprises a dome shape extending upward from the top surface 105. Also in various embodiments, the second raised region 602 comprises a cross shape (as depicted in FIGS. 6A and 6B) extending upward from the dome of the first raised region 604. In various embodiments, the second raised region 602 comprises mostly a nylon resin and minimal carbon fiber bundles, and the first region 604 comprises carbon fiber bundles and nylon resin.

With further reference to FIGS. 6A and 6B, in various embodiments, as ultrasonic welding is initiated, the material of the second raised region 602 (namely, the cross-shaped region thereof) melts from the application of a metallic horn (e.g., the horn 220 as depicted in FIG. 2) with a specific high frequency (e.g., 20-30 kHz) and pressure to generate heat during ultrasonic welding. As the material of the second raised region 602 (namely, the cross-shaped region thereof) melts, the carbon fiber bundles of the first raised region 604 that is beneath it do not melt. In certain embodiments, the first raised region 604 helps to prevent the flow of carbon fiber bundles into the second raised region 602.

In addition, in various embodiments, once the melted material of the second raised region 602 reaches the first surface 105 of the mating part, the melted nylon resin of region 602 melts into the nylon resin of the upper surface 105 of the mating part and then solidifies, the welding is complete. In various embodiments, the material of the first raised region 604 does not melt (e.g., because the rich carbon fiber bundles of the first raised region 604 do not melt during the ultrasonic welding), but rather is used as a bond gap that maintains the adhesive thickness between the two welded parts. In various embodiments, the energy director 110 (including the first raised region 604) contacts the upper surface 105 of the component 100 to be welded together, such that the nylon resin of respective components 100 are welded together during the ultrasonic welding.

With continued reference to FIGS. 6A and 6B, and similar to the discussion above, in various embodiments the design for the energy director 110 mitigates the flow of carbon fiber bundles into the second raised region 602, allowing for a higher strength ultrasonic welds within the faying surface. Also in various embodiments, the energy director 110 is a dual purpose design, allowing adhesive bond line thickness control and restricting unwanted carbon fiber bundle flow. In addition, in various embodiments, when the ultrasonic energy is turned on, and the hammering effect of the horn growing and shrinking creates heat, the energy director 110 focuses the heat into a controlled area first at the center (namely, the second raised region 602), melting the nylon resin uniformly, while the first region 604 maintains the adhesive joint bond line thickness.

Figure 7A:
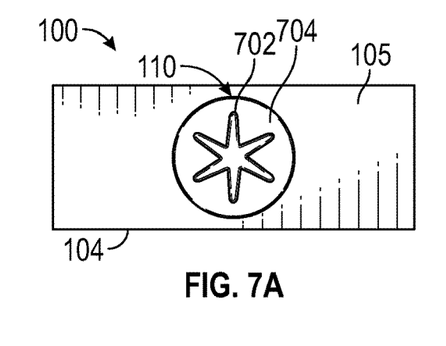
FIGS. 7A and 7B provide a top view and a perspective view, respectively, of a weld component with a fifth exemplary configuration of an energy director with raised surfaces including a star and dome pattern for controlling welding of the component, in accordance with an exemplary embodiment.
Figure 7B:
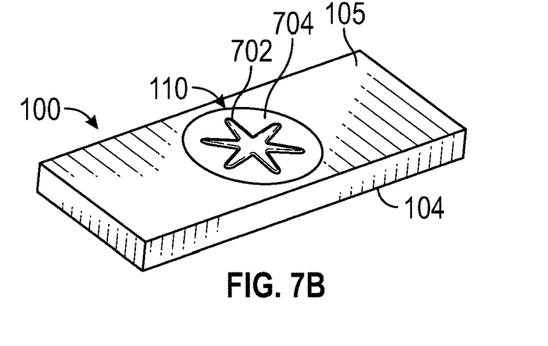

FIGS. 7A and 7B provide top and perspective views, respectively, of a weld component 100 with a fifth exemplary configuration of an energy director 110 with raised surfaces including a star and dome pattern for controlling welding of the component 100, in accordance with an exemplary embodiment.

As shown in FIGS. 7A and 7B, in certain embodiments, the energy director 110 includes two distinct levels of raised regions, namely: (i) a first raised region 704; and (ii) a second raised region 702. In various embodiments, the first raised region 704 comprises a dome shape extending upward from the top surface 105. Also in various embodiments, the second raised region 702 comprises a star shape (as depicted in FIGS. 7A and 7B) extending upward from the dome of the first raised region 704. In various embodiments, the second raised region 702 comprises a nylon resin rich and minimal carbon fiber bundles, and the first region 704 comprises carbon fiber bundles and nylon resin.

With further reference to FIGS. 7A and 7B, in various embodiments, as ultrasonic welding is initiated, the material of the second raised region 702 (namely, the star-shaped region thereof) melts from the application of a metallic horn (e.g., the horn 220 as depicted in FIG. 2) with a specific high frequency (e.g., 20-30 kHz) and pressure to generate heat during ultrasonic welding. As the material (nylon resin) of the second raised region 702 (namely, the star-shaped region thereof) melts, the first raised region 704 that is beneath does not melt, due to the rich carbon fiber bundles. In certain embodiments, the first raised region 704 helps to prevent the flow of carbon fiber bundles into the second raised region 702.

In addition, in various embodiments, once the melted material of the second raised region 702 reaches the upper surface 105 of the mating part, the melted nylon resin of region 702 melts into the nylon resin of the upper surface 105 of the mating part and then solidifies, the welding is complete. In various embodiments, the material of the first raised region 704 does not melt (e.g., because the rich carbon fiber bundles material of the first raised region 704 does not melt during the ultrasonic welding), but rather is used as a bond gap that maintains the adhesive thickness between the welded parts. In various embodiments, the energy director 110 (including the first raised region 704) contacts the upper surface 105 of the components 100 to be welded together, such that the nylon resin of respective components 100 are welded together during the ultrasonic welding.

With continued reference to FIGS. 7A and 7B, and similar to the discussion above, in various embodiments the design for the energy director 110 mitigates the flow of carbon fiber bundles into the second raised region 702, allowing for a higher strength ultrasonic welds within the faying surface. Also in various embodiments, the energy director 110 is a dual purpose design, allowing adhesive bond line thickness control and restricting unwanted carbon fiber bundle flow. In addition, in various embodiments, when the ultrasonic energy is turned on, and the hammering effect of the horn growing and shrinking creates heat, the energy director 110 focuses the heat into a controlled area first at the center (namely, the second raised region 702), melting the nylon resin uniformly, while maintaining the adhesive joint bond line thickness.

Figure 8A:
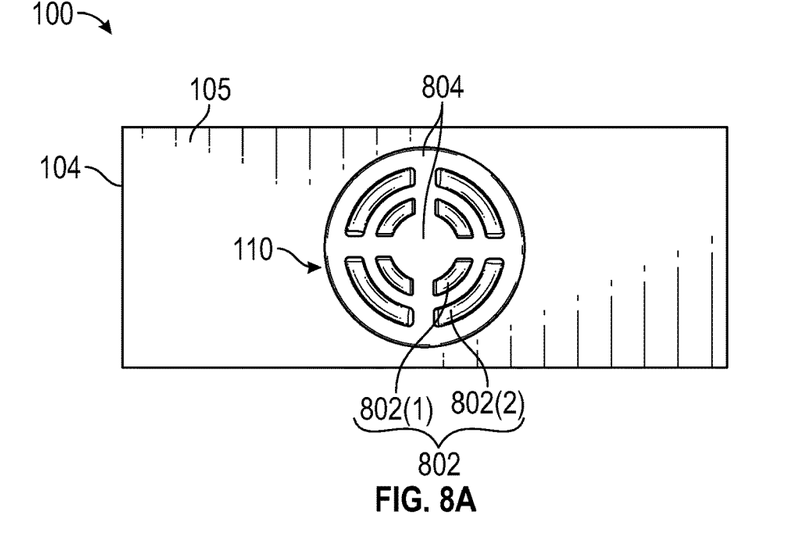
FIGS. 8A and 8B provide a top view and a perspective view, respectively, of a weld component with a sixth exemplary configuration of an energy director with raised surfaces in which a first raised region comprises a raised dome and second and third raised regions comprising of a plurality of arc circular shapes, in accordance with an exemplary embodiment.
Figure 8B:
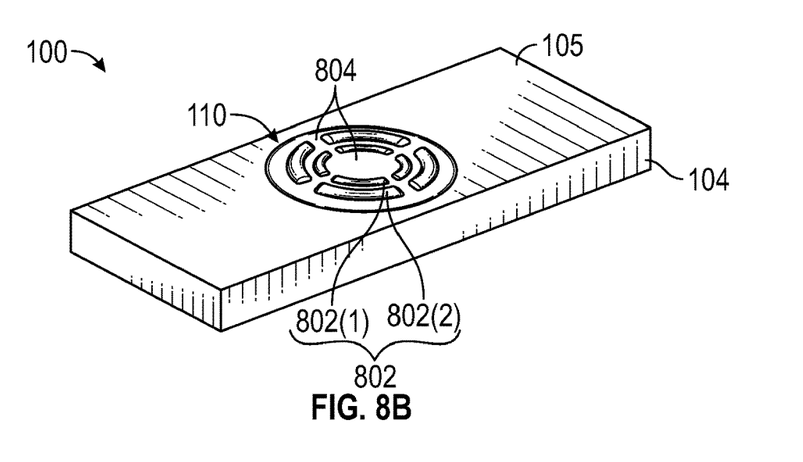

FIGS. 8A and 8B provide top and perspective views, respectively, of a weld component 100 with a sixth exemplary configuration of an energy director 110 with raised surfaces in which a first raised region comprises a raised circular dome, a second and third raised region comprise a plurality of arc circular shapes, in accordance with an exemplary embodiment.

As shown in FIGS. 8A and 8B, in certain embodiments, the energy director 110 includes three distinct levels of raised regions, namely: (i) a first raised region 804; and (ii) a second raised region 802(2) and (iii) a third raised region 802(1). In various embodiments, the first raised region 804 comprises a raised dome extending upward from the top surface 105. Also in various embodiments, the second raised region 802(2) comprises a set of raised arc circles 802(2) and a third raised region 802(1) comprises a set of raised arc circles 802(1) (as depicted in FIGS. 8A and 8B) extending upward from, the dome of the first raised region 804. In various embodiments, the second and third raised regions 802 comprise a rich nylon resin, and the first region 804 comprises a carbon fiber bundles and nylon resin.

With further reference to FIGS. 8A and 8B, in various embodiments, as ultrasonic welding is initiated, the material of the second and third raised regions 802 (namely, the set of raised arc circles 802(2) and 802(1), which may also collectively be referred to as raised arc circles 802) melts from the application of a metallic horn (e.g., the horn 220 as depicted in FIG. 2) with a specific high frequency (e.g., 20-30 kHz) and pressure to generate heat during ultrasonic welding. As the nylon resin material of the second and third raised regions 802 (namely, the set of raised arc circles 802(2) and 802(1)) melts, the first raised region 804 that is beneath does not melt due to the rich carbon fiber bundles.

In addition, in various embodiments, once the melted nylon resin material of the second and third raised regions 802 reach the upper surface 105 of the mating part, the melted nylon resin of regions 802 melt into the nylon resin of the upper surface 105 of the mating part and then solidify, the welding is complete. In various embodiments, the material of the first raised region 804 does not melt (e.g., because the carbon fiber bundles of the first raised region 804 does not melt during the ultrasonic welding), but rather is used as a bond gap that maintains the adhesive thickness between the welded parts. In various embodiments, the energy director 110 (including the first raised region 804) contacts the upper surface 105 of the components 100 to be welded together, such that the nylon resin of respective components 100 are welded together during the ultrasonic welding.

With continued reference to FIGS. 8A and 8B, and similar to the discussion above, in various embodiments the design for the energy director 110 mitigates the flow of carbon fiber bundles into the second and third raised regions 802, allowing for a higher strength ultrasonic welds within the faying surface. Also in various embodiments, the bullseye pattern energy director 110 is a dual purpose design, allowing adhesive bond line thickness control and restricting unwanted carbon fiber bundle flow. In addition, in various embodiments, when the ultrasonic energy is turned on, and the hammering effect of the horn growing and shrinking creates heat, the energy director 110 focuses the heat into a controlled area first at the center (namely, the third then the second raised regions 802), melting the nylon resin uniformly, while the first raised dome 804 maintains the adhesive joint bond line thickness.

Accordingly, in various embodiments, energy directors, weld components, and welding systems are provided for ultrasonic welding. In various embodiments, different levels of raised nylon resin rich surfaces are provided by the energy directors that help to contain the flow of carbon fiber bundles into the weld interface surfaces and improve the consistency and strength of the welds during ultrasonic welding.

It will be appreciated that the various energy directors, weld components, welding assemblies, and various components thereof and implementations and applications thereof, may vary from those depicted in FIGS. 1A-8B, in various embodiments.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An energy director for use in ultrasonic welding, the energy director comprising:
    a first raised region extending upward from a surface of a base of a component to be welded;
    a second raised region extending upward from the first raised region; and
    a third raised region also extending upward from the first raised region;
    wherein the first raised region is disposed underneath the second raised region, such that when material of the second raised region melts, the material of the first raised region is not melted and maintains an adhesive bond line thickness;
    wherein the first raised region is also disposed underneath the third raised region, and wherein the third raised region extends upward from a center of the first raised region, such that material of the third raised region melts uniformly, and when this occurs the material of the second raised region also melts uniformly but the material of the first raised region does not melt.

2. The energy director of claim 1, wherein
    the base comprises a nylon resin and carbon fiber bundle reinforced thermal plastic; and
    the second raised region and the third raised region both comprise a nylon resin rich material.

3. The energy director of claim 1, wherein:
    the first raised region comprises a dome shape extending upward from the surface of the base; and
    the second raised region extends upward from the dome shape.

4. The energy director of claim 1,
    wherein the first raised region and the second raised region are concentric around the third raised region.

5. The energy director of claim 1, wherein the first, second, and third raised regions collectively form a bullseye pattern, with the third raised region being at a center of the bullseye pattern.

6. The energy director of claim 1, wherein:
    the first raised region comprises a first dome shape; and
    the second raised region comprises a plurality of arcs extending in a generally circular manner above the first dome shape and around an arc center comprising the third raised region.

7. The energy director of claim 1, wherein the second region comprises a plurality of second sub-regions, each of the plurality of second sub-regions extending upward from, and on top of, the first raised region.

8. The energy director of claim 1, wherein the first raised region sets an adhesive bond gap for welded components and reduces carbon fiber bundle flow.

9. A weld component for ultrasonic welding, the weld component comprising:
    a base; and
    an energy director comprising:
        a first raised region extending upward from the base; and
        a second raised region extending upward from the first raised region; and
        a third raised region also extending upward from the first raised region;
    wherein the first raised region is disposed underneath the second raised region, such that when material of the second raised region melts, the material of the first raised region does not melt and acts to maintain an adhesive bond line thickness between welded parts;
    wherein the first raised region is also disposed underneath the third raised region, and wherein the third raised region extends upward from a center of the first raised region, such that material of the third raised region melts uniformly, and when this occurs the material of the second raised region also melts uniformly but the material of the first raised region does not melt.

10. The weld component of claim 9, further comprising:
    wherein the first raised region and the second raised region are concentric around the third raised region.

11. The weld component of claim 10, wherein the first, second, and third raised regions collectively form a bullseye pattern, with the third raised region being at a center of the bullseye pattern.

12. The weld component of claim 9, wherein:
    the base comprises a nylon resin and carbon fiber bundle reinforced thermal plastic; and
    the second raised region and the third raised region both comprise a nylon resin rich material.

13. The weld component of claim 9, wherein:
    the first raised region comprises a dome shape extending upward from an upper surface of the base; and
    the second raised region extends upward from the dome shape.

14. The weld component of claim 9, wherein:
    the first raised region comprises a first dome shape; and
    the second raised region comprises a plurality of arcs extending in a generally circular manner above the first dome shape and around an arc center comprising the third raised region.

15. The weld component of claim 9, wherein the second raised region comprises a plurality of second sub-regions, each of the plurality of second sub-regions extending upward from, and on top of, the first raised region.

16. The weld component of claim 9, wherein the first raised region sets an adhesive bond gap for welded components and reduces carbon fiber bundle flow.

17. A welding assembly comprising:
    a first component to be welded, the first component comprising:
        a first base; and
        an energy director comprising:
            a first raised region extending upward from the first base;
            a second raised region extending upward from the first raised region; and
            a third raised region also extending upward from the first raised region;

wherein the first raised region is disposed underneath the second raised region, such that when material of the second raised region melts, the material of the first raised region does not melt and maintains an adhesive bond thickness between welded parts;

wherein the first raised region is also disposed underneath the third raised region, and wherein the third raised region extends upward from a center of the first raised region, such that material of the third raised region melts uniformly, and when this occurs the material of the second raised region also melts uniformly but the material of the first raised region does not melt;

a second component to be welded to the first component, the second component comprising a second base; and a horn configured to be applied to the first base or the second base, for ultrasonic welding of the second component to the first component via the energy director.

\* \* \* \* \*